(12) United States Patent
Mathews (10) Patent No.: US 8,428,877 B2
(45) Date of Patent: Apr. 23, 2013

(54) NAVIGATION SYSTEM WITH VEHICLE RETRIEVAL RESERVATION MECHANISM AND METHOD OF OPERATION THEREOF

(75) Inventor: Emily Mathews, Palo Alto, CA (US)

(73) Assignee: TeleNav, Inc., Sunnyvale, CA (US)

( * ) Notice: Subject to any disclaimer, the term of this patent is extended or adjusted under 35 U.S.C. 154(b) by 678 days.

(21) Appl. No.: 12/623,332

(22) Filed: Nov. 20, 2009

(65) Prior Publication Data

US 2011/0125395 A1    May 26, 2011

(51) Int. Cl.
*G01C 21/34* (2006.01)

(52) U.S. Cl.
USPC ............................................. 701/533; 340/990

(58) Field of Classification Search .................. 701/533, 701/532, 301, 454, 428, 438, 468, 516; 340/988, 340/990, 995.1, 994, 993, 995.24, 439; 709/218, 709/245
See application file for complete search history.

(56) References Cited

U.S. PATENT DOCUMENTS

| 5,116,182 | A | 5/1992 | Lin |
| 6,065,921 | A | 5/2000 | Van Dijk |
| 6,407,698 | B1 * | 6/2002 | Ayed ..................... 342/357.31 |
| 6,650,999 | B1 | 11/2003 | Brust et al. |
| 2003/0055689 | A1 | 3/2003 | Block et al. |
| 2004/0236508 | A1 | 11/2004 | Ogasawara |
| 2008/0033769 | A1 | 2/2008 | Koorapati et al. |
| 2009/0146846 | A1 | 6/2009 | Grossman |
| 2011/0106445 | A1 * | 5/2011 | Mayer et al. .................. 701/209 |

OTHER PUBLICATIONS

International Search Report for Application No. PCT/US2010/057126 dated Jan. 11, 2011.

* cited by examiner

*Primary Examiner* — Thomas Black
*Assistant Examiner* — Luke Huynh (57) ABSTRACT

A method of operation of a navigation system includes: receiving a retrieval reservation having an exit time; generating an alert with the exit time for retrieving a vehicle from a parked location; and identifying a pick-up location based on the alert for parking the vehicle at the pick-up location.

18 Claims, 8 Drawing Sheets

NAVIGATION SYSTEM WITH VEHICLE RETRIEVAL RESERVATION MECHANISM AND METHOD OF OPERATION THEREOF

TECHNICAL FIELD

The present invention relates generally to a navigation system and more particularly to a navigation system with vehicle retrieval reservation mechanism.

BACKGROUND ART

Modern portable consumer and industrial electronics, especially client devices such as navigation systems, cellular phones, portable digital assistants, and combination devices, are providing increasing levels of functionality to support modern life including location-based information services. Numerous technologies have been developed to utilize this new functionality.

As users become more empowered with the growth of mobile location based service devices, new and old paradigms begin to take advantage of this new device space. There are many technological solutions to take advantage of this new device location opportunity. One existing approach is to use location information to provide navigation services such as a global positioning system (GPS) for a car or on a mobile device such as a cell phone or a personal digital assistant (PDA).

Location based services allow users to create, transfer, store, and consume information that affects the "real world". Today, navigation systems aid users by incorporating available, real-time relevant information, such as maps, directions, local businesses, or other points of interest (POI). The real-time information provides invaluable relevant information, when available or in service areas. However, the shortage of time or crowded space still creates challenges for navigation systems with location-based services to navigation to and from point of interests.

Thus, a need still remains for a navigation system with vehicle retrieval mechanism for more efficient navigation route and scheduling. In view of the need for more efficient navigation systems, it is increasingly critical that answers be found to these problems. In view of the ever-increasing commercial competitive pressures, along with growing consumer expectations and the diminishing opportunities for meaningful product differentiation in the marketplace, it is critical that answers be found for these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

The present invention provides a method of operation of a navigation system including: receiving a retrieval reservation having an exit time; generating an alert with the exit time for retrieving a vehicle from a parked location; and identifying a pick-up location based on the alert for parking the vehicle at the pick-up location.

The present invention provides a navigation system including: a retrieval reservation module for receiving a retrieval reservation having an exit time; a generate alert module, coupled to the retrieval reservation module, for generating an alert with the exit time for retrieving a vehicle from a parked location; and a pick-up location module, coupled to the generate alert module, for identifying a pick-up location based on the alert for parking the vehicle at the pick-up location that is retrieved from the parked location.

Certain embodiments of the invention have other steps or elements in addition to or in place of those mentioned above. The steps or elements will become apparent to those skilled in the art from a reading of the following detailed description when taken with reference to the accompanying drawings.

BEST MODE FOR CARRYING OUT THE INVENTION

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the system are semi-diagrammatic and not to scale and, particularly, some of the dimensions are for the clarity of presentation and are shown exaggerated in the drawing FIGs. Similarly, although the views in the drawings for ease of description generally show similar orientations, this depiction in the FIGs. is arbitrary for the most part. Generally, the invention can be operated in any orientation. The embodiments have been numbered first embodiment, second embodiment, etc. as a matter of descriptive convenience and are not intended to have any other significance or provide limitations for the present invention.

One skilled in the art would appreciate that the format with which navigation information is expressed is not critical to some embodiments of the invention. For example, in some embodiments, navigation information is presented in the format of (X,Y), where X and Y are two ordinates that define the geographic location, i.e., a position of a user.

In an alternative embodiment, navigation information is presented by longitude and latitude related information. In a further embodiment of the present invention, the navigation information also includes a velocity element comprising a speed component and a heading component.

The term "relevant information" referred to herein comprises the navigation information described as well as information relating to points of interest to the user, such as local business, hours of businesses, types of businesses, advertised specials, traffic information, maps, local events, and nearby community or personal information.

The term "module" referred to herein can include software, hardware, or a combination thereof. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof.

Figure 1:
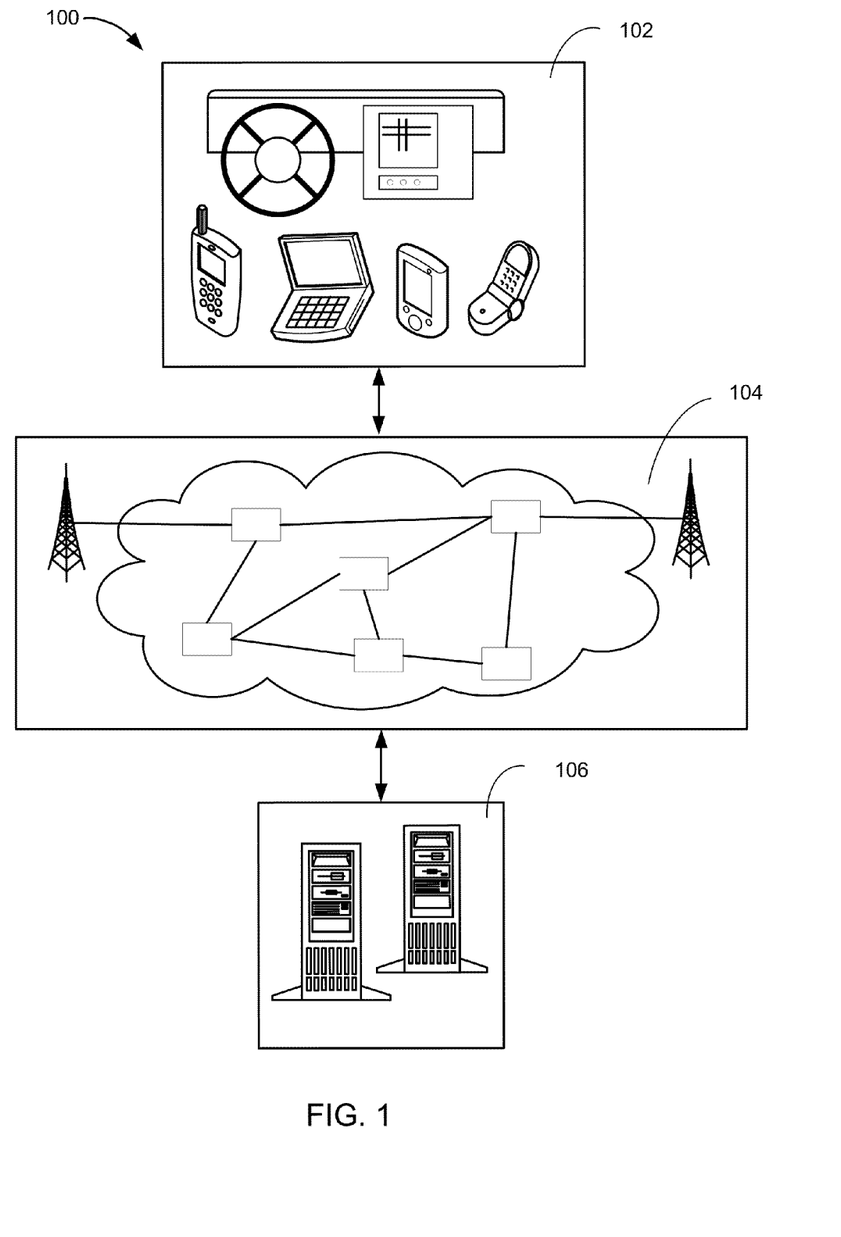
FIG. 1 is a navigation system with vehicle retrieval mechanism in a first embodiment of the present invention.

Referring now to FIG. 1, therein is shown a navigation system 100 with vehicle retrieval mechanism in a first embodiment of the present invention. The navigation system 100 includes a first device 102, such as a client or a server, connected to a second device 106, such as a client or server, with a communication path 104, such as a wireless or wired network.

For example, the first device 102 can be of any of a variety of mobile devices, such as a cellular phone, personal digital assistant, a notebook computer, automotive telematic navigation system, or other multi-functional mobile communication or entertainment device. The first device 102 can be a standalone device, or can be incorporated with a vehicle, for example a car, truck, bus, or train. The first device 102 can couple to the communication path 104 to communicate with the second device 106.

For illustrative purposes, the navigation system 100 is described with the first device 102 as a mobile computing device, although it is understood that the first device 102 can be different types of computing devices. For example, the first device 102 can also be a non-mobile computing device, such as a server, a server farm, or a desktop computer.

The second device 106 can be any of a variety of centralized or decentralized computing devices. For example, the second device 106 can be a computer, grid computing resources, a virtualized computer resource, cloud computing resource, routers, switches, peer-to-peer distributed computing devices, or a combination thereof.

The second device 106 can be centralized in a single computer room, distributed across different rooms, distributed across different geographical locations, embedded within a telecommunications network. The second device 106 can have a means for coupling with the communication path 104 to communicate with the first device 102. The second device 106 can also be a client type device as described for the first device 102.

In another example, the first device 102 can be a particularized machine, such as a mainframe, a server, a cluster server, rack mounted server, or a blade server, or as more specific examples, an IBM System z10™ Business Class mainframe or a HP ProLiant ML™ server. Yet another example, the second device 106 can be a particularized machine, such as a portable computing device, a thin client, a notebook, a netbook, a smartphone, personal digital assistant, or a cellular phone, and as specific examples, an Apple iPhone™, Palm Centro™, or Moto Q Global™.

For illustrative purposes, the navigation system 100 is described with the second device 106 as a non-mobile computing device, although it is understood that the second device 106 can be different types of computing devices. For example, the second device 106 can also be a mobile computing device, such as notebook computer, another client device, or a different type of client device. The second device 106 can be a standalone device, or can be incorporated with a vehicle, for example a car, truck, bus, or train.

Also for illustrative purposes, the navigation system 100 is shown with the second device 106 and the first device 102 as end points of the communication path 104, although it is understood that the navigation system 100 can have a different partition between the first device 102, the second device 106, and the communication path 104. For example, the first device 102, the second device 106, or a combination thereof can also function as part of the communication path 104.

The communication path 104 can be a variety of networks. For example, the communication path 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the communication path 104.

Further, the communication path 104 can traverse a number of network topologies and distances. For example, the communication path 104 can include direct connection, personal area network (PAN), local area network (LAN), metropolitan area network (MAN), wide area network (WAN) or any combination thereof.

Figure 2:
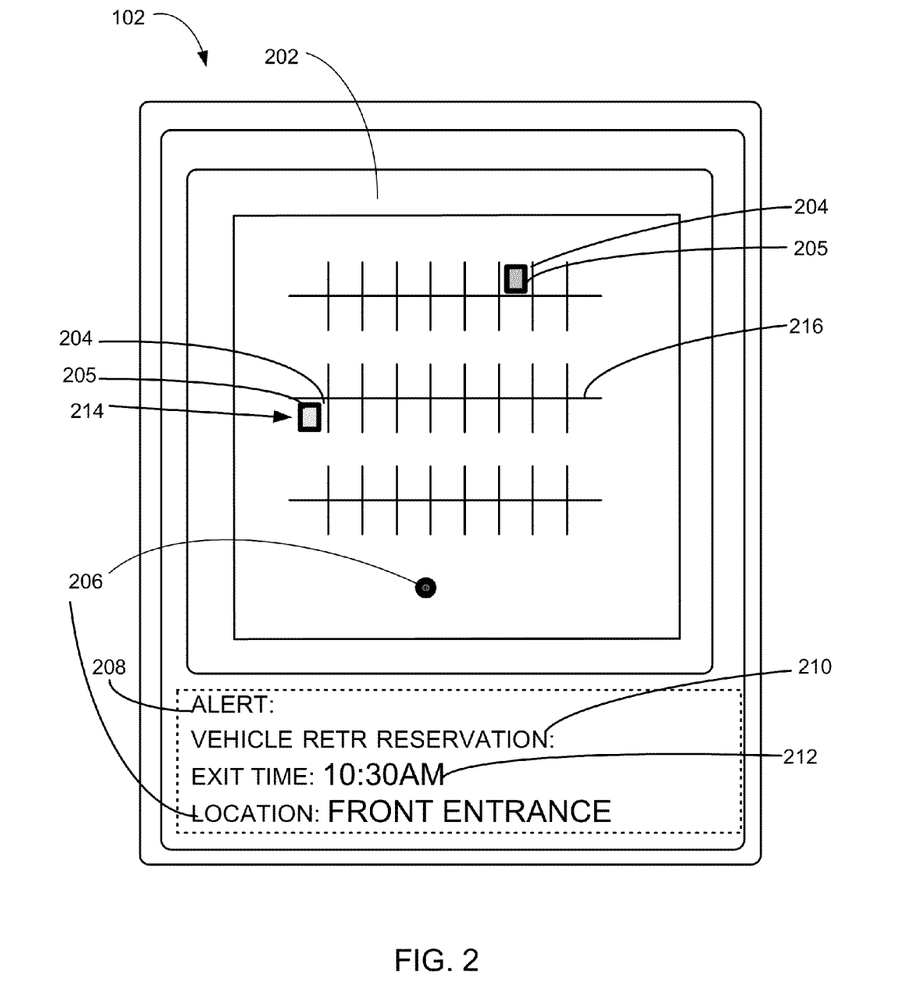
FIG. 2 is a first example of a display interface of the first device.

Referring now to FIG. 2, therein is shown a first example of a display interface 202 of the first device 102. The display interface 202 can depict a parked location 204, a vehicle 205, a pick-up location 206, an alert 208, a retrieval reservation 210, an exit time 212, and a parking facility 216. The display interface 202 can depict also another of the vehicle 205, at another of the parked location 204 and a further retrieval reservation 214.

The display interface 202 can depict a screen shot of the first device 102 that can receive the retrieval reservation 210. For example, the parked location 204 can be represented with the vehicle 205 parked at the parking facility 216 that a retrieval service has received a reservation to have moved to the pick-up location 206.

The vehicle 205 can contain a device that emits a location signal, such as a global positioning system (GPS) signal or a cellular signal for triangulation. For example, this device can be the first device 102 or a tracking device. The location signal allows the parked location 204 to be identified for the generation of the alert 208 for the retrieval reservation 210. The vehicle 205 can be any vehicle such as a car, a bus, a van, a pick-up truck, a motorcycle, a motor home, or a scooter.

For example, the parked location 204 can be a particular space in the parking facility 216, which can be a single level or multi-level parking garage, parking lot or vehicle storage facility, or it can be a certain distance from the intersection along the curb of a street. The parked location 204 does not have to be in the parking facility 216. The parked location 204 can be displayed on the display interface 202 as text, a map location, a set of coordinates, or a combination thereof.

The pick-up location 206 can represent a specific geographic location where the vehicle 205 is to be picked up by the user of the retrieval service. For example, the pick-up location 206 can be curbside at the front entrance of a professional building, a concert hall or a particular store within a shopping mall. The pick-up location 206 can also be set by selecting from the list of possible locations based on the parked location 204. The pick-up location 206 can be displayed on the display interface 202 as text, a map location, a set of coordinates, or a combination thereof.

The alert 208 can be an overall message container to notify the user, the vehicle provider, or the retrieval service of the retrieval reservation 210, including the exit time 212, the pick-up location 206, and any changes thereof. The alert 208 can be implemented in a number of ways.

For example, the alert 208 can be a pop up message on the display interface 202. The alert 208 can also be an audio alarm. For example the alert 208 can be a notification message sent by the retrieval service to a hotel valet service so that the vehicle 205 can be ready for the user at check-out. The alert 208 can also be from the user to the retrieval service for the retrieval reservation 210. The alert 208 can even be a reminder message sent by the retrieval service to the user that the vehicle 205 is being retrieved.

The retrieval reservation 210 can represent a reservation to move the vehicle 205 from the parked location 204 to the pick-up location 206 so that the vehicle 205 can be ready for use at the exit time 212. For example, the retrieval service can receive the retrieval reservation 210 for 10:30AM at the front entrance for a user expecting to complete his appointment then, and would like to leave immediately for his next appointment.

The exit time 212 can be the time at which the vehicle 205 is to be at the pick-up location 206. On the display interface 202, the exit time 212 is shown to be 10:30AM, as an example. The exit time 212 can be can be selected to a specific time, a time limit, a time countdown, or a combination thereof. For example, the exit time 212 can be chosen to be the earlier of 10:30AM or one hour from now, where now is the entry time of the retrieval reservation 210.

For illustrative purposes, the navigation system 100 is described with the retrieval reservation 210 having the exit time 212 as a time entry and display, although it is understood that the navigation system 100 can have different formats for the exit time 212. For example, the exit time 212 can be entered or display can be in a relative format, such as "an hour from now" or "half an hour before the event ends."

Also for illustrative purposes, another of the vehicle 205 with another of the parked location 204 is shown on the display interface 202. The other instantiation of the vehicle 205 can be associated with the further retrieval reservation 214. The further retrieval reservation 214 can cause conflict with the retrieval reservation 210 and can require the selection of the pick-up location 206 in an order of the exit time 212 relative to the further retrieval reservation 214. For example, the retrieval reservation 210 is shown in FIG. 2 to be for 10:30AM at the front entrance. If the further retrieval reservation 214 is for 10:29AM at the front entrance, then the earlier time for the exit time 212 can require the selection of another of the pick-up location 206 for the retrieval reservation 210.

Figure 3:
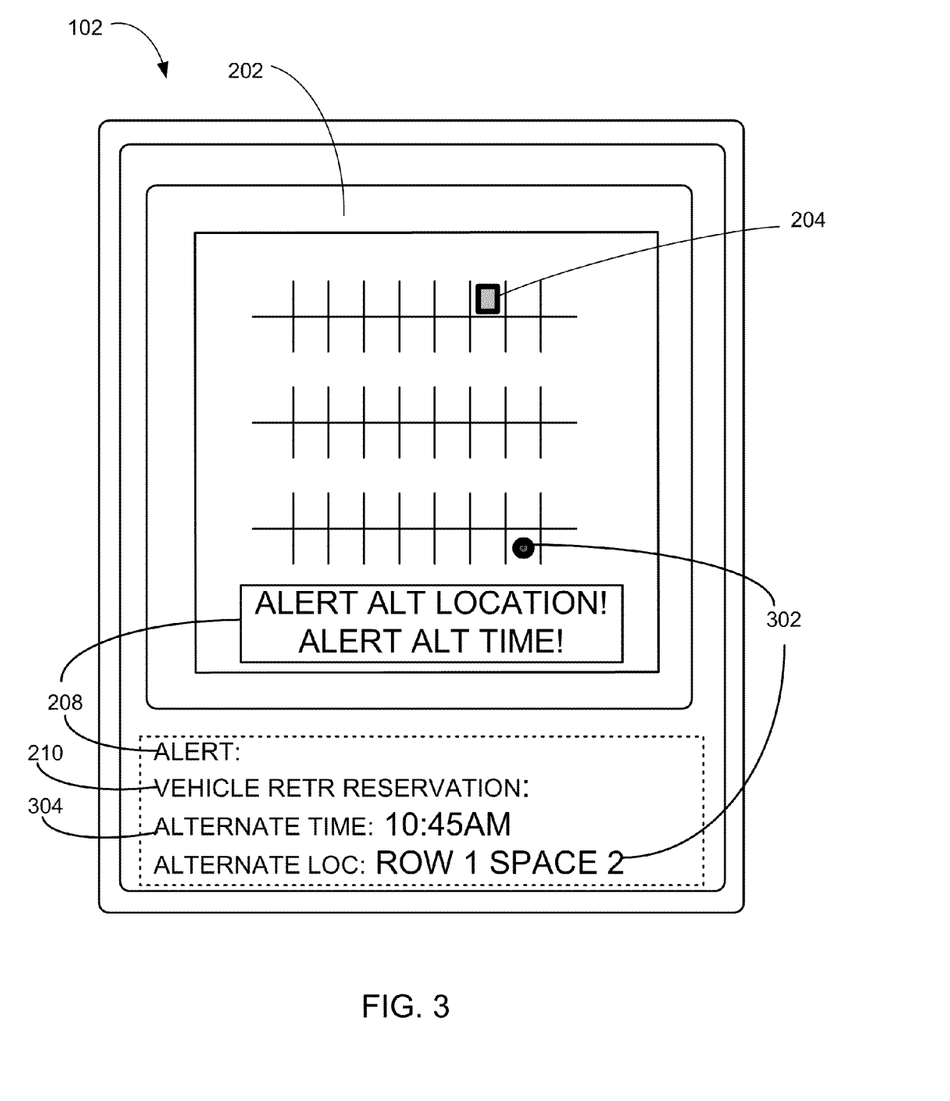
FIG. 3 is a second example of the display interface.

Referring now to FIG. 3, therein is shown a second example of the display interface 202. The display interface 202 can depict the parked location 204, the alert 208, and the retrieval reservation 210. The display interface 202 can also depict an alternate location 302 and an alternate time 304. The display interface 202 can depict the alert 208 for the retrieval reservation 210 with the alternate location 302 and the alternate time 304.

The alternate location 302 can represent a different location for pick-up than the pick-up location 206. For example, the pick-up location 206 can be un-accessible possibly requiring a choice of the alternate location 302. The alert 208 can be sent by the retrieval service to notify the user of the alternate location 302. As yet another example, the retrieval service can accommodate the user to have a change in plans or to choose the alternate location 302 closer to his present location. The alert 208 with the alternate location 302, in this case, can be for a modification to the retrieval reservation 210.

The alternate time 304 can be due to a change to the exit time 212 of FIG. 2. For example, the alternate time 304 can be the result of a modification to the retrieval reservation 210. The alert 208 can be sent by the retrieval service to notify the vehicle provider of the alternate time 304. As yet another example, the alternate time 304 can be the result of a change notification from the user to the retrieval service when he realizes he needs more time for the appointment. The alert 208 with the alternate time 304 can be for an update to the retrieval reservation 210.

On the display interface 202, the alert 208 is shown to be for the alternate location 302 and for the alternate time 304. The alternate location 302 and the alternate time 304 can also be chosen independently.

Figure 4:
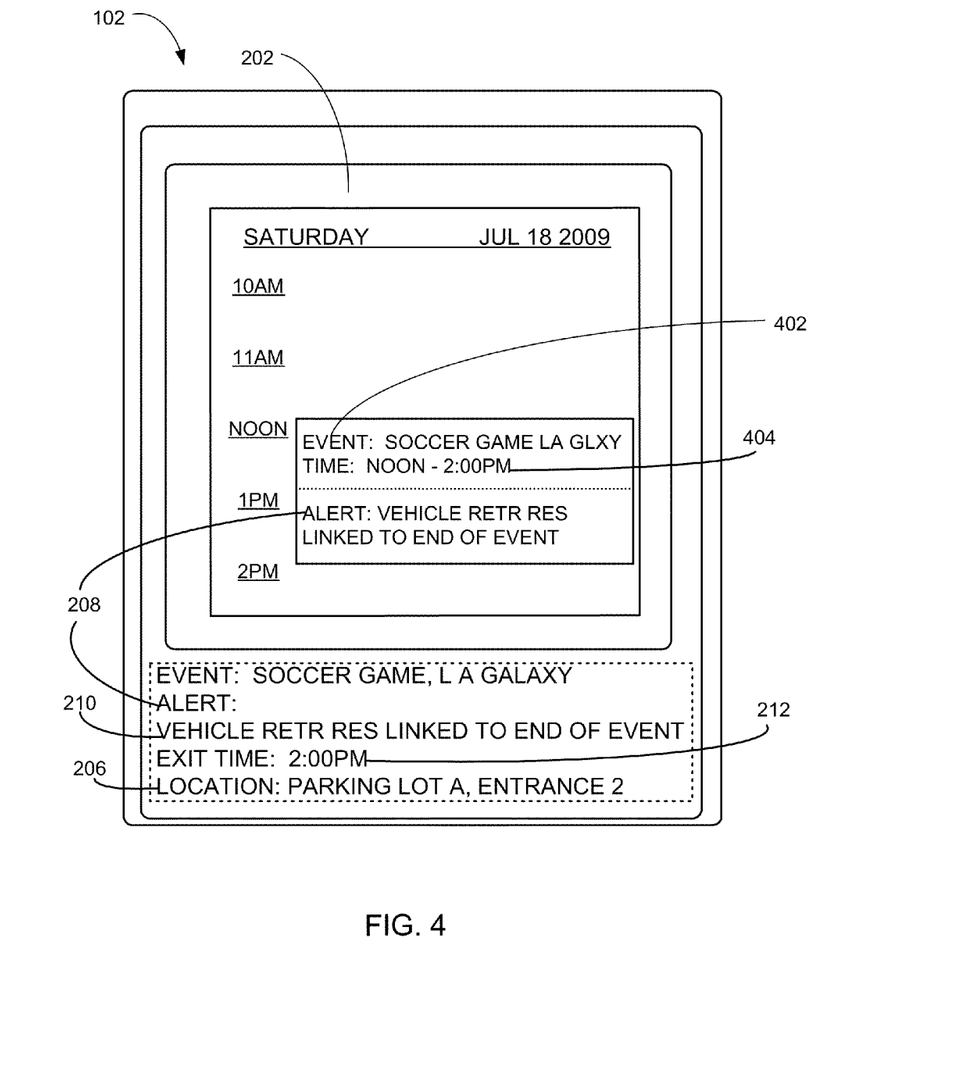
FIG. 4 is a third example of the display interface.

Referring now to FIG. 4, therein is shown a third example of the display interface 202. The display interface 202 can depict the alert 208, the retrieval reservation 210, the exit time 212, and the pick-up location 206. The display interface 202 can depict an event 402 and an event end time 404.

The event 402 can represent any event on a calendar which can have the retrieval reservation 210 linked to it. For example, the event 402 can be an appointment, a reservation, a trip, a date, or a travel time set aside to reach to another of the event 402.

The event end time 404 can be the end of the time span associated with the event 402. The event end time 404 can be identified as the end of the planned appointment time, such as 2PM exactly for a noon to 2PM appointment. The event end time 404 can also be identified with the actual end of the event 402. For example, the appointment scheduled for noon to 2PM can actually end at 1:55PM.

The association of the retrieval reservation 210 with the event 402 by the navigation system 100 can result in a generation of the alert 208 for the retrieval reservation 210 with the exit time 212 based on the event end time 404. For example, the exit time 212 at the end of a soccer game when the vehicle 205 of FIG. 2 is needed to exit the area can be delayed by 10 minutes if the event end time 404 is delayed by 10 minutes.

The association of the retrieval reservation 210 with the event 402 can offer efficiency in the management of a calendar. For example, if the event 402 is delayed, rescheduled, or cancelled, the retrieval reservation 210 can be delayed, rescheduled, or cancelled accordingly without additional user input.

Figure 5:
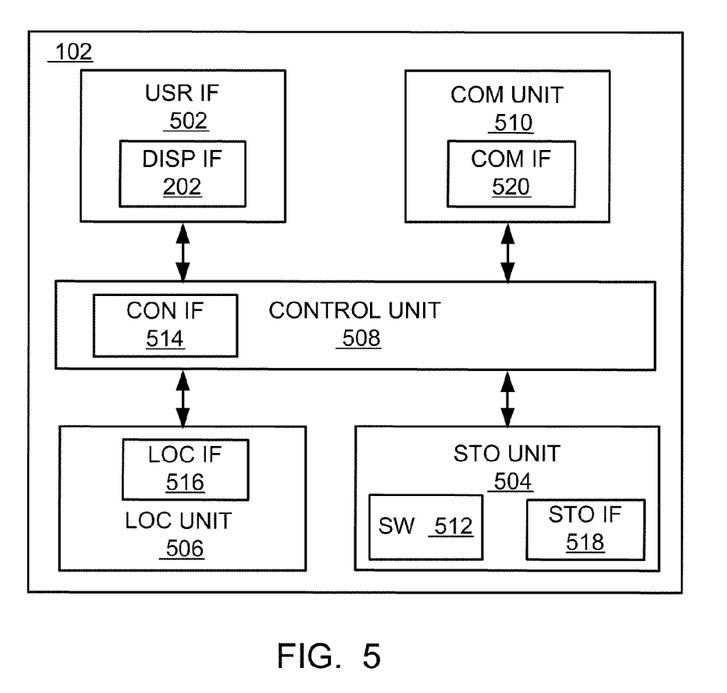
FIG. 5 is an exemplary block diagram of the first device.

Referring now to FIG. 5, therein is shown an exemplary block diagram of the first device 102. The first device 102 can include a user interface 502, a storage unit 504, a location unit 506, a control unit 508, and a communication unit 510.

The user interface 502 allows a user (not shown) to interface and interact with the first device 102. The user interface 502 can include an input device and an output device. Examples of the input device of the user interface 502 can include a keypad, a touchpad, soft-keys, a keyboard, a microphone, or any combination thereof to provide data and communication inputs. Examples of the output device of the user interface 502 can include the display interface 202. The display interface 202 can include a display, a projector, a video screen, a speaker, or any combination thereof.

The control unit 508 can execute a software 512 to provide the intelligence of the navigation system 100. The control unit 508 can operate the user interface 502 to display information generated by the navigation system 100. The control unit 508 can also execute the software 512 for the other functions of the navigation system 100, including receiving location information from the location unit 506. The control unit 508 can further execute the software 512 for interaction with the communication path 104 of FIG. 1 via the communication unit 510.

The control unit 508 can be implemented in a number of different manners. For example, the control unit 508 can be a processor, an embedded processor, a microprocessor, a hardware control logic, a hardware finite state machine (FSM), a digital signal processor (DSP), or a combination thereof.

The control unit 508 can include a controller interface 514. The controller interface 514 can be used for communication between the control unit 508 and other functional units in the first device 102. The controller interface 514 can also be used for communication that is external to the first device 102.

The controller interface 514 can receive information from the other functional units or from external sources, or can transmit information to the other functional units or to external destinations. The external sources and the external destinations refer to sources and destinations external to the first device 102.

The controller interface 514 can be implemented in different ways and can include different implementations depending on which functional units or external units are being interfaced with the controller interface 514. For example, the controller interface 514 can be implemented with a pressure sensor, an inertial sensor, a microelectromechanical system (MEMS), optical circuitry, waveguides, wireless circuitry, wireline circuitry, or a combination thereof.

The location unit 506 can generate location information, current heading, and current speed of the first device 102, as examples. The location unit 506 can be implemented in many ways. For example, the location unit 506 can function as at least a part of a global positioning system (GPS), an inertial navigation system, a cellular-tower location system, a pressure location system, or any combination thereof.

The location unit 506 can include a location interface 516. The location interface 516 can be used for communication between the location unit 506 and other functional units in the first device 102. The location interface 516 can also be used for communication that is external to the first device 102.

The location interface 516 can receive information from the other functional units or from external sources, or can transmit information to the other functional units or to external destinations. The external sources and the external destinations refer to sources and destinations external to the first device 102.

The location interface 516 can include different implementations depending on which functional units or external units are being interfaced with the location unit 506. The location interface 516 can be implemented with technologies and techniques similar to the implementation of the controller interface 514.

The storage unit 504 can store the software 512. The storage unit 504 can also store the relevant information, such as advertisements, points of interest (POI), navigation routing entries, or any combination thereof.

The storage unit 504 can be a volatile memory, a nonvolatile memory, an internal memory, an external memory, or a combination thereof. For example, the storage unit 504 can be a nonvolatile storage such as non-volatile random access memory (NVRAM), Flash memory, disk storage, or a volatile storage such as static random access memory (SRAM).

The storage unit 504 can include a storage interface 518. The storage interface 518 can be used for communication between the location unit 506 and other functional units in the first device 102. The storage interface 518 can also be used for communication that is external to the first device 102.

The storage interface 518 can receive information from the other functional units or from external sources, or can transmit information to the other functional units or to external destinations. The external sources and the external destinations refer to sources and destinations external to the first device 102.

The storage interface 518 can include different implementations depending on which functional units or external units are being interfaced with the storage unit 504. The storage interface 518 can be implemented with technologies and techniques similar to the implementation of the controller interface 514.

The communication unit 510 can enable external communication to and from the first device 102. For example, the communication unit 510 can permit the first device 102 to communicate with the second device 106 of FIG. 1, an attachment, such as a peripheral device or a computer desktop, and the communication path 104.

The communication unit 510 can also function as a communication hub allowing the first device 102 to function as part of the communication path 104 and not limited to be an end point or terminal unit to the communication path 104. The communication unit 510 can include active and passive components, such as microelectronics or an antenna, for interaction with the communication path 104.

The communication unit 510 can include a communication interface 520. The communication interface 520 can be used for communication between the communication unit 510 and other functional units in the first device 102. The communication interface 520 can receive information from the other functional units or can transmit information to the other functional units.

The communication interface 520 can include different implementations depending on which functional units are being interfaced with the communication unit 510. The communication interface 520 can be implemented with technologies and techniques similar to the implementation of the controller interface 514.

For illustrative purposes, the navigation system 100 is shown with the partition having the user interface 502, the storage unit 504, the location unit 506, the control unit 508, and the communication unit 510 although it is understood that the navigation system 100 can have a different partition. For example, the software 512 can be partitioned differently such that some or all of its function can be in the control unit 508, the location unit 506, and the communication unit 510. Also, the first device 102 can include other functional units not shown in FIG. 5 for clarity.

The functional units in the first device 102 can work individually and independently of the other functional units. The first device 102 can work individually and independently from the second device 106 and the communication path 104.

Figure 6:
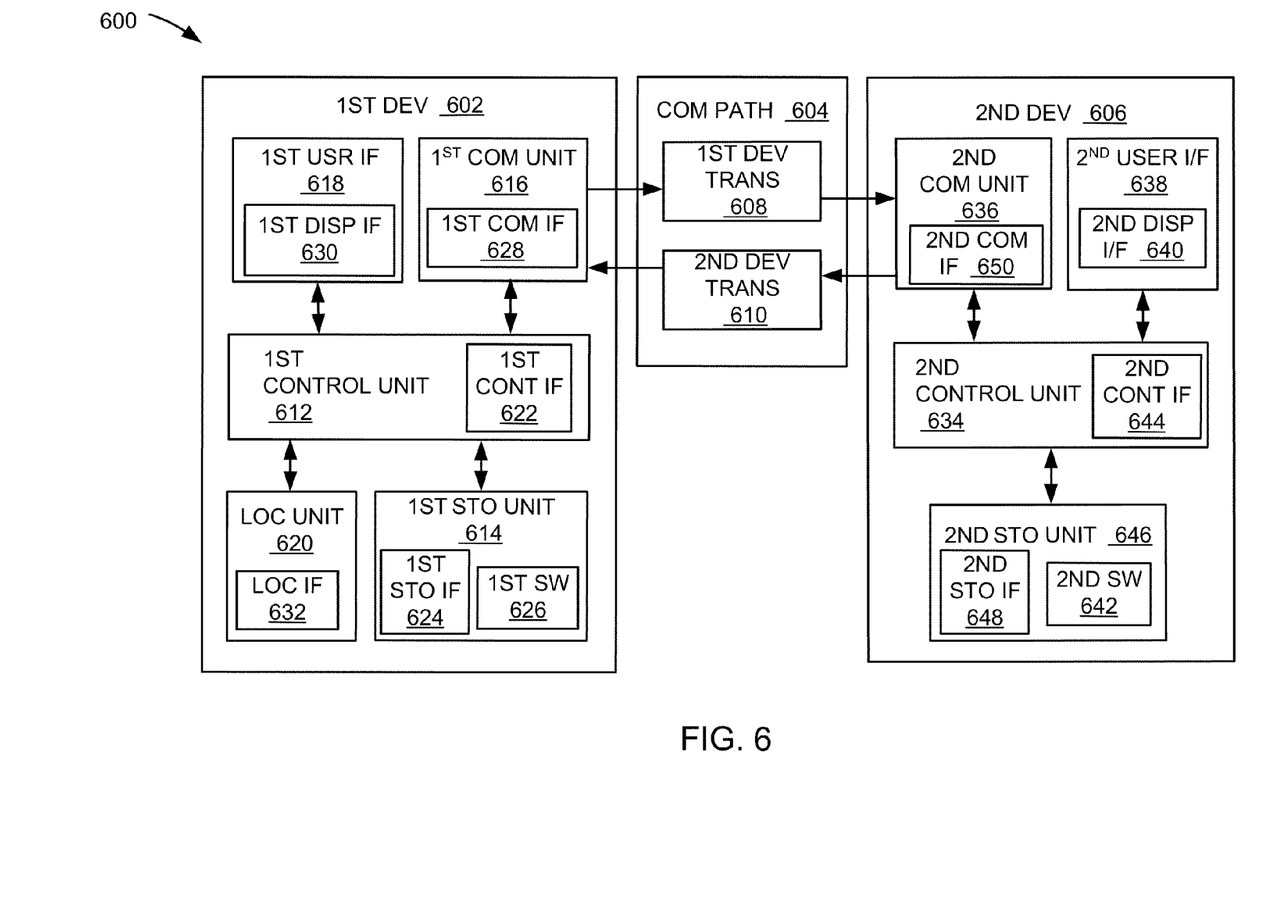
FIG. 6 is an exemplary block diagram of a navigation system with vehicle retrieval mechanism in a second embodiment of the present invention.

Referring now to FIG. 6, therein is shown an exemplary block diagram of a navigation system 600 with vehicle retrieval mechanism in a second embodiment of the present invention. The navigation system 600 can include a first device 602, a communication path 604, and a second device 606.

The first device 602 can communicate with the second device 606 over the communication path 604. For example, the first device 602, the communication path 604, and the second device 606 can be the first device 102 of FIG. 1, the communication path 104 of FIG. 1, and the second device 106 of FIG. 1, respectively. The screen shot shown on the display interface 202 described in FIG. 2 can represent the screen shot for the navigation system 600.

The first device 602 can send information in a first device transmission 608 over the communication path 604 to the second device 606. The second device 606 can send information in a second device transmission 610 over the communication path 604 to the first device 602.

For illustrative purposes, the navigation system 600 is shown with the first device 602 as a client device, although it is understood that the navigation system 600 can have the first device 602 as a different type of device. For example, the first device 602 can be a server.

Also for illustrative purposes, the navigation system 600 is shown with the second device 606 as a server, although it is understood that the navigation system 600 can have the second device 606 as a different type of device. For example, the second device 606 can be a client device.

For brevity of description in this embodiment of the present invention, the first device 602 will be described as a client device and the second device 606 will be described as a server device. The present invention is not limited to this selection for the type of devices. The selection is an example of the present invention.

The first device 602 can include a first control unit 612, a first storage unit 614, a first communication unit 616, a first user interface 618, and a location unit 620. The first device 602 can be similarly described by the first device 102.

The first control unit 612 can include a first controller interface 622. The first control unit 612 and the first controller interface 622 can be similarly described as the control unit 508 of FIG. 5 and the controller interface 514 of FIG. 5, respectively.

The first storage unit 614 can include a first storage interface 624. The first storage unit 614 and the first storage interface 624 can be similarly described as the storage unit 504 of FIG. 5 and the storage interface 518 of FIG. 5, respectively. A first software 626 can be stored in the first storage unit 614.

The first communication unit 616 can include a first communication interface 628. The first communication unit 616 and the first communication interface 628 can be similarly described as the communication unit 510 of FIG. 5 and the communication interface 520 of FIG. 5, respectively.

The first user interface 618 can include a first display interface 630. The first user interface 618 and the first display interface 630 can be similarly described as the user interface 502 of FIG. 5 and the display interface 202 of FIG. 5, respectively.

The location unit 620 can include a location interface 632. The location unit 620 and the location interface 632 can be similarly described as the location unit 506 of FIG. 5 and the location interface 516 of FIG. 5, respectively.

The performance, architectures, and type of technologies can also differ between the first device 102 and the first device 602. For example, the first device 102 can function as a single device embodiment of the present invention and can have a higher performance than the first device 602. The first device 602 can be similarly optimized for a multiple device embodiment of the present invention.

For example, the first device 102 can have a higher performance with increased processing power in the control unit 508 compared to the first control unit 612. The storage unit 504 can provide higher storage capacity and access time compared to the first storage unit 614.

Also for example, the first device 602 can be optimized to provide increased communication performance in the first communication unit 616 compared to the communication unit 510. The first storage unit 614 can be sized smaller compared to the storage unit 504. The first software 626 can be smaller than the software 512 of FIG. 5.

The second device 606 can be optimized for implementing the present invention in a multiple device embodiment with the first device 602. The second device 606 can provide the additional or higher performance processing power compared to the first device 602. The second device 606 can include a second control unit 634, a second communication unit 636, and a second user interface 638.

The second user interface 638 allows a user (not shown) to interface and interact with the second device 606. The second user interface 638 can include an input device and an output device. Examples of the input device of the second user interface 638 can include a keypad, a touchpad, soft-keys, a keyboard, a microphone, or any combination thereof to provide data and communication inputs. Examples of the output device of the second user interface 638 can include a second display interface 640. The second display interface 640 can include a display, a projector, a video screen, a speaker, or any combination thereof.

The second control unit 634 can execute a second software 642 to provide the intelligence of the second device 106 of the navigation system 600. The second software 642 can operate in conjunction with the first software 626. The second control unit 634 can provide additional performance compared to the first control unit 612 or the control unit 508.

The second control unit 634 can operate the second user interface 638 to display information. The second control unit 634 can also execute the second software 642 for the other functions of the navigation system 600, including operating the second communication unit 636 to communicate with the first device 602 over the communication path 604.

The second control unit 634 can be implemented in a number of different manners. For example, the second control unit 634 can be a processor, an embedded processor, a microprocessor, a hardware control logic, a hardware finite state machine (FSM), a digital signal processor (DSP), or a combination thereof.

The second control unit 634 can include a second controller interface 644. The second controller interface 644 can be used for communication between the second control unit 634 and other functional units in the second device 606. The second controller interface 644 can also be used for communication that is external to the second device 606.

The second controller interface 644 can receive information from the other functional units or from external sources, or can transmit information to the other functional units or to external destinations. The external sources and the external destinations refer to sources and destinations external to the second device 606.

The second controller interface 644 can be implemented in different ways and can include different implementations depending on which functional units or external units are being interfaced with the second controller interface 644. For example, the second controller interface 644 can be implemented with a pressure sensor, an inertial sensor, a microelectromechanical system (MEMS), optical circuitry, waveguides, wireless circuitry, wireline circuitry, or a combination thereof.

A second storage unit 646 can store the second software 642. The second storage unit 646 can also store the relevant information, such as advertisements, points of interest (POI), navigation routing entries, or any combination thereof. The second storage unit 646 can be sized to provide the additional storage capacity to supplement the first storage unit 614.

For illustrative purposes, the second storage unit 646 is shown as a single element, although it is understood that the second storage unit 646 can be a distribution of storage elements. Also for illustrative purposes, the navigation system 600 is shown with the second storage unit 646 as a single hierarchy storage system, although it is understood that the navigation system 600 can have the second storage unit 646 in a different configuration. For example, the second storage unit 646 can be formed with different storage technologies forming a memory hierarchal system including different levels of caching, main memory, rotating media, or off-line storage.

The second storage unit 646 can be a volatile memory, a nonvolatile memory, an internal memory, an external memory, or a combination thereof. For example, the second storage unit 646 can be a nonvolatile storage such as nonvolatile random access memory (NVRAM), Flash memory, disk storage, or a volatile storage such as static random access memory (SRAM).

The second storage unit 646 can include a second storage interface 648. The second storage interface 648 can be used for communication between the location unit 506 and other functional units in the second device 606. The second storage interface 648 can also be used for communication that is external to the second device 606.

The second storage interface 648 can receive information from the other functional units or from external sources, or can transmit information to the other functional units or to external destinations. The external sources and the external destinations refer to sources and destinations external to the second device 606.

The second storage interface 648 can include different implementations depending on which functional units or external units are being interfaced with the second storage unit 646. The second storage interface 648 can be implemented with technologies and techniques similar to the implementation of the second controller interface 644.

The second communication unit 636 can enable external communication to and from the second device 606. For example, the second communication unit 636 can permit the second device 606 to communicate with the first device 602 over the communication path 604.

The second communication unit 636 can also function as a communication hub allowing the second device 606 to function as part of the communication path 604 and not limited to be an end point or terminal unit to the communication path 604. The second communication unit 636 can include active and passive components, such as microelectronics or an antenna, for interaction with the communication path 604.

The second communication unit 636 can include a second communication interface 650. The second communication interface 650 can be used for communication between the second communication unit 636 and other functional units in the second device 606. The second communication interface 650 can receive information from the other functional units or can transmit information to the other functional units.

The second communication interface 650 can include different implementations depending on which functional units are being interfaced with the second communication unit 636. The second communication interface 650 can be implemented with technologies and techniques similar to the implementation of the second controller interface 644.

The first communication unit 616 can couple with the communication path 604 to send information to the second device 606 in the first device transmission 608. The second device 606 can receive information in the second communication unit 636 from the first device transmission 608 of the communication path 604.

The second communication unit 636 can couple with the communication path 604 to send information to the first device 602 in the second device transmission 610. The first device 602 can receive information in the first communication unit 616 from the second device transmission 610 of the communication path 604. The navigation system 600 can be executed by the first control unit 612, the second control unit 634, or a combination thereof.

For illustrative purposes, the second device 106 is shown with the partition having the second user interface 638, the second storage unit 646, the second control unit 634, and the second communication unit 636, although it is understood that the second device 106 can have a different partition. For example, the second software 642 can be partitioned differently such that some or all of its function can be in the second control unit 634 and the second communication unit 636. Also, the second device 606 can include other functional units not shown in FIG. 6 for clarity.

The functional units in the first device 602 can work individually and independently of the other functional units. The first device 602 can work individually and independently from the second device 606 and the communication path 604.

The functional units in the second device 606 can work individually and independently of the other functional units. The second device 606 can work individually and independently from the first device 602 and the communication path 604.

For illustrative purposes, the navigation system 600 is described by operation of the first device 602 and the second device 606. It is understood that the first device 602 and the second device 606 can operate any of the modules and functions of the navigation system 600. For example, the first device 602 is described to operate the location unit 620, although it is understood that the second device 606 can also operate the location unit 620.

Figure 7:
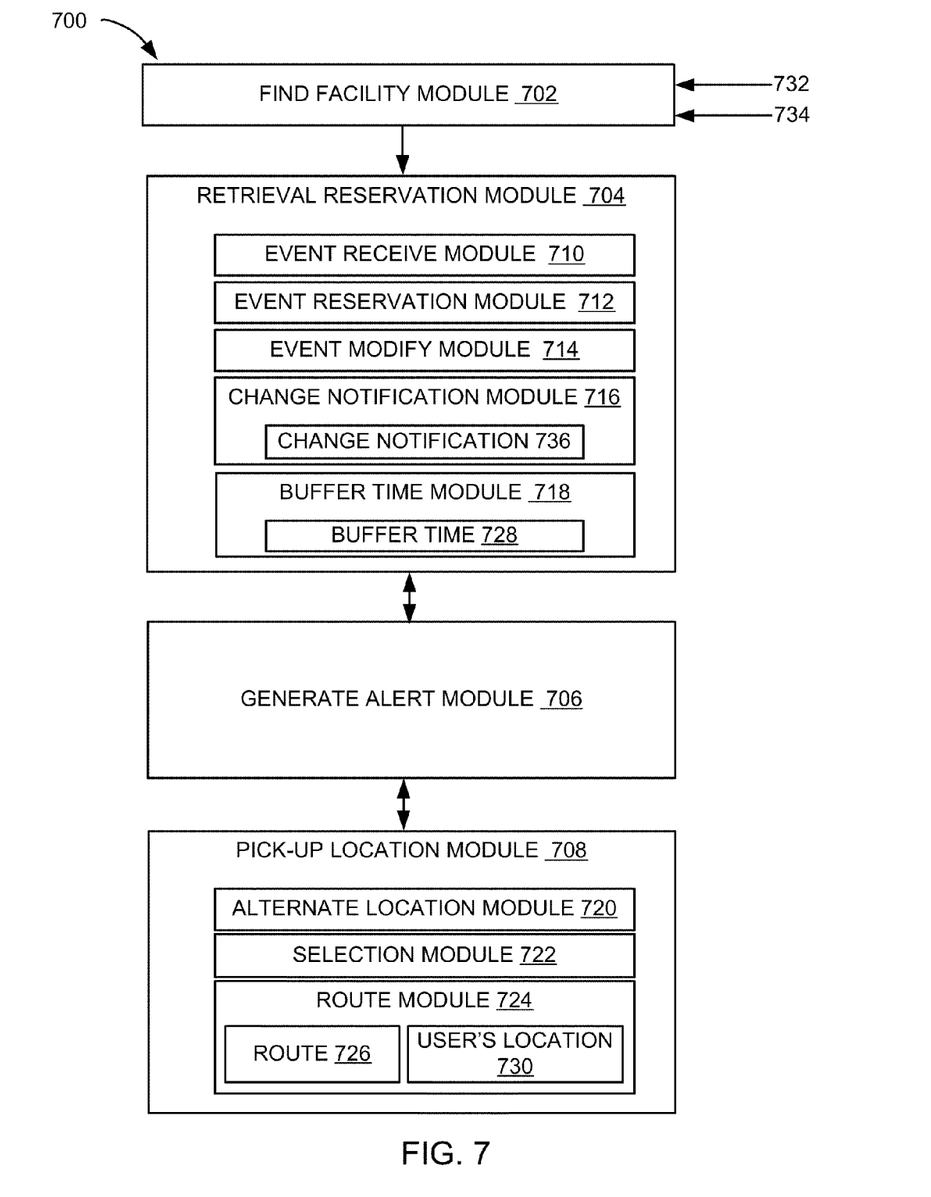
FIG. 7 is a navigation system with vehicle retrieval mechanism in a third embodiment of the present invention.

Referring now to FIG. 7, therein is shown a navigation system 700 with vehicle retrieval mechanism in a third embodiment of the present invention. The navigation system 700 can include a find facility module 702, a retrieval reservation module 704, a generate alert module 706, and a pick-up location module 708. These modules represent the primary functional aspects of the vehicle retrieval mechanism.

In the navigation system 700, as an example, each module is indicated by a number and successively higher module numbers follow one another. Control flow can pass from one module to the next higher numbered module in the same hierarchy unless explicitly otherwise indicated.

For illustrative purposes, the modules of the navigation system 700 are described as discrete functional modules, although it is understood that these modules can have a different configuration. For example, the find facility module 702, the retrieval reservation module 704, the generate alert module 706, and the pick-up location module 708, may not be discrete functional modules but may have one or more of the aforementioned modules combined into one functional module.

The find facility module 702 can direct the user to the parking facility 216 of FIG. 2 that can accept the retrieval reservation 210 of FIG. 2 for the vehicle 205 of FIG. 2. The direction can be user-initiated or automatically selected by the navigation system 700 with the retrieval service. For example, the find facility module 702 can prompt the user with a possible list of the parking facility 216 that can accept the retrieval reservation 210 when the user sets up the retrieval reservation 210 of FIG. 2 at a point of interest.

The find facility module 702 can be customized with user preferences. For example, the find facility module 702 can exclude the parking facility 216 that cannot accept the retrieval reservation 210. The find facility module 702 can prioritize parking facility 216 which can accept retrieval reservation 210 by additional criteria such as the distance to the point-of-interest or the cost. The find facility module 702 can be coupled to the retrieval reservation module 704.

The retrieval reservation module 704 can receive or generate the retrieval reservation 210, including a request 732 or a change 734. The retrieval reservation module 704 can be coupled to the generate alert module 706.

The retrieval reservation module 704 can receive the retrieval reservation 210 to retrieve the vehicle 205 of FIG. 2 so that the vehicle 205 can be ready for use at the exit time 212 of FIG. 2. For example, the retrieval reservation module 704 can receive the retrieval reservation 210 for 10:30AM at the front entrance for a user expecting to complete his appointment approximately at 10:30AM and would like to leave immediately for his next appointment.

The retrieval reservation module 704 can include additional modules for additional capabilities. The retrieval reservation module 704 can include an event receive module 710, an event reservation module 712, an event modify module 714, a change notification module 716 which generates a change notification 736 and a buffer time module 718 which generates a buffer time 728.

The event receive module 710, which can be included in the retrieval reservation module 704, can receive the event end time 404 of FIG. 4 of the event 402 of FIG. 4. The receipt of the event end time 404 can result in the association of the event 402 with the retrieval reservation 210.

The event reservation module 712, which can also be included in the retrieval reservation module 704, can modify the retrieval reservation 210 based on the event end time 404. For example, the event reservation module 712 can set or generate the retrieval reservation 210 with the exit time 212 equal to or proximate the event end time 404.

The event reservation module 712 does not necessarily have to set the exit time 212 equal to the event end time 404. As an example, the event reservation module 712 can set the exit time 212 equal to the event end time 404 plus 10 minutes for the user to walk from his current location to the pick-up location 206. As another example, the event reservation module 712 can set the exit time 212 30 minutes before the event end time 404 in case the meeting may end early.

The event modify module 714, which can be further included in the retrieval reservation module 704, can modify the exit time 212 of the retrieval reservation 210 based on a change to the event end time 404. For example, the event modify module 714 can delay the exit time 212 by 10 minutes when the event end time 404 is delayed by 10 minutes.

The event receive module 710, the event reservation module 712, and the event modify module 714 can be used for multiple or repeating cases of the retrieval reservation 210 associated with the event 402. For example, the retrieval reservation 210 can be set to repeat by association with the event 402 which repeats on the calendar on a regular basis, such as a weekly trip to the gym or a monthly visit to a favorite restaurant.

The change notification module 716, which is yet another module that can be included in the retrieval reservation module 704, can receive the change notification 736 to the exit time 212. For example, the user can delay, reschedule, or cancel the exit time 212 for the retrieval reservation 210 due to the change 734 which occurs in the schedule. For yet another example, the vehicle provider can notify a delay in the exit time 212 due to a back-up of others of the vehicle 205 at the pick-up location 206, or due to others of the further retrieval reservation 214 of FIG. 2 with the earlier time for the exit time 212. The generate alert module 706 can generate the alert 208 with the alternate time 304 of FIG. 3.

The buffer time module 718, as one more of the modules which can be included in the retrieval reservation module 704, can calculate the buffer time 728 before the exit time 212. The generate alert module 706, coupled to the buffer time module 718, can generate the alert 208 at the buffer time 728.

The buffer time module 718 can calculate the buffer time 728 to accommodate the amount of time required by the vehicle provider to move the vehicle 205 from the parked location 204 to the pick-up location 206 using various information. For example, the distance between the parked location 204 and the pick-up location 206, the number of valets working, and number of others of the request 732 for retrieval can all influence the buffer time 728.

For the retrieval reservation 210 with the event 402 that repeats, the buffer time 728 can be calculated for each occurrence. The buffer time module 718 can recalculate the buffer time 728 when another of the request 732 or the change 734 is received.

The generate alert module 706 can generate the alert 208 with the exit time 212 for retrieving the vehicle 205 from the parked location 204 of FIG. 2. The alert 208 can be sent to a vehicle provider, such as a valet service, a vehicle storage facility, or a rental car facility. The alert 208 can also be sent to the user as a reminder or confirmation of the reservation. The alert 208 can be received by the retrieval service for the retrieval reservation 210. When the change 734 is received for the retrieval reservation 210, another of the alert 208 can be sent with the new information.

The pick-up location module 708 can identify the pick-up location 206 of FIG. 2 based on the alert 208 for the retrieval reservation 210 for parking the vehicle 205 at the pick-up location 206 that is retrieved from the parked location 204. The generate alert module 706 can be coupled to the pick-up location module 708.

The pick-up location module 708 can identify the pick-up location 206 by considering information regarding the parked location 204, a user's location 730, and the vehicle provider. For example, based on the parked location 204, the pick-up location module 708 can identify the vehicle provider and choose the closest available place to the user's location 730 for the pick-up location 206.

The pick-up location module 708 can include other modules which add additional functions. The pick-up location module 708 can include an alternate location module 720, a selection module 722, and a route module 724.

The alternate location module 720, which can be included in the pick-up location module 708, can receive the request 732 for the alternate location 302 of FIG. 3 instead of the pick-up location 206. For example, the user can initiate the request 732 for the alternate location 302 if his current location is closer to another of the pick-up location 206 than the one he had previously chosen. As yet another example, the user can send the request 732 for the alternate location 302 to be a near-by parking spot if he is running a few minutes behind and do not want his car idling at the curb during that time.

The selection module 722, which can also be included in the pick-up location module 708, can select the pick-up location 206 in an order of the exit time 212 relative to the further retrieval reservation 214. For example, there can be a substantial demand on the valet service vehicle provider at nearly the same time, as is frequently encountered at the end of a concert or a ball game. During such situation, the vehicle provider can select the pick-up location 206 to best accommodate the demand, such as by sending more users to the pick-up location 206 which is less crowded.

The route module 724, which is yet another module that can be included in the pick-up location module, can generate a route 726 from the user's location 730 to the pick-up location 206. For example, if the user is in an unfamiliar place and does not remember how to get to the pick-up location 206, the route module 724 can guide the user to the pick-up location 206 for the vehicle 205.

The navigation system 700 can be partitioned between the first device 602 of FIG. 6 and the second device 606 of FIG. 6. For example, the navigation system 700 can be partition into the functional units of the first device 602, the second device 606, or a combination thereof. The navigation system 700 can also be implemented as additional functional units in the first device 102 of FIG. 1, the first device 602, the second device 606, or a combination thereof.

It has been discovered that the present invention provides the navigation system 700 with vehicle retrieval reservation mechanism for more efficient navigation route and scheduling. The navigation system can receive the retrieval reservation 210, generate the alert 208 based on the retrieval reservation 210, and identify the pick-up location 206. The navigation system 700 can also associate the retrieval reservation 210 to the event 402, and receive modifications in the exit time 212 and the pick-up location 206. The navigation system 700 can further calculate the buffer time 728 for the retrieval reservation 210 and route a user to the pick-up location 206.

The physical transformation of the retrieval reservation 210, the exit time 212, or the event end time 404 results in movement in the physical world, such as the movement of vehicles, based on the operation of the navigation system 700. As the movement of the vehicles in the physical world occurs, the movement itself creates additional information that is converted back to the retrieval reservation 210, the pick-up location 206, or the alert 208 for the continued operation of the navigation system 700 and to continue the movement in the physical world.

Thus, it has been discovered that the navigation system of the present invention furnishes important and heretofore unknown and unavailable solutions, capabilities, and functional aspects for vehicle retrieval reservation.

The find facility module 702 can use the location unit 506 of FIG. 5, the communication unit 510 of FIG. 5, the control unit 508 of FIG. 5, the storage unit 504 of FIG. 5 or a combination thereof to find facilities that can accept the retrieval reservation 210. The find facility module 702 can use the display interface 202 of FIG. 2 to display the location of the facilities.

The find facility module 702 can also use the location unit 620 of FIG. 6, the first communication unit 616 of FIG. 6, the first control unit 612 of FIG. 6, the second communication unit 636 of FIG. 6, the second control unit 634 of FIG. 6, the second storage unit 646 of FIG. 6, or the combination thereof to find facilities that can accept the retrieval reservation 210. The find facility module 702 can also use the first display interface 630 of FIG. 6 to display the location of the facilities.

The retrieval reservation module 704 can use the user interface 502 of FIG. 5, the control unit 508, the communication unit 510, and the storage unit 504 to receive the retrieval reservation 210, and to perform the functions of its submodules. For example, the retrieval reservation module 704 can use the display interface 202 to display the retrieval reservation 210 and the storage unit 504 to store the retrieval reservation 210.

As another example, the buffer time module 718 can use the control unit 508 and the buffer time 728 can be stored in the storage unit 504. As a further example, the event receive module 710, the event reservation module 712, the event modify module 714, and the change notification module 716 can use the user interface 502, the communication unit 510, the control unit 508 or a combination thereof to receive and modify the retrieval reservation 210.

The retrieval reservation module 704 can also use the first user interface 618 of FIG. 6, the first communication unit 616, the first control unit 612, the second communication unit 636, the second control unit 634, the second storage unit 646, or a combination thereof to receive the retrieval reservation 210 and to perform the functions of its submodules. For example, the retrieval reservation 210 can be stored in the second storage unit 646.

The generate alert module 706 can use can use the user interface 502, the control unit 508, and the communication unit 510 to generate the alert 208. The alert 208 can be communicated via a network with the communication unit 510 or displayed on the display interface 202 of the user interface 502.

The generate alert module can also use the first user interface 618, the first communication unit 616, the first control unit 612, the second communication unit 636, the second control unit 634 or a combination thereof to generate the alert 208. For example, the alert 208 can be generated by the second control unit 634, and communicated by the second communication unit 636 for display on the first display interface 630.

The pick-up location module 708 can use can use the user interface 502, the storage unit 504, the location unit 506, the control unit 508, and the communication unit 510 to identify the pick-up location 206. For example, the pick-up location module 708 can use the location unit 506 to identify the parked location 204, the control unit 508 to look up the vehicle provider from the storage unit 504 to find the pick-up location 206.

The pick-up location module 708 can also use the first user interface 618, the first communication unit 616, the first control unit 612, the second communication unit 636, the second control unit 634, the second storage unit 646 or a combination thereof to identify the pick-up location 206.

The navigation system 700 describes the module functions or order as an example. The modules can be partitioned differently. For example, the event receive module 710, the event reservation module 712, and the event modify module 714 can be coupled to each other and separately rather than contained within the retrieval reservation module 704. Each of the modules can operate individually and independently of the other modules.

Figure 8:
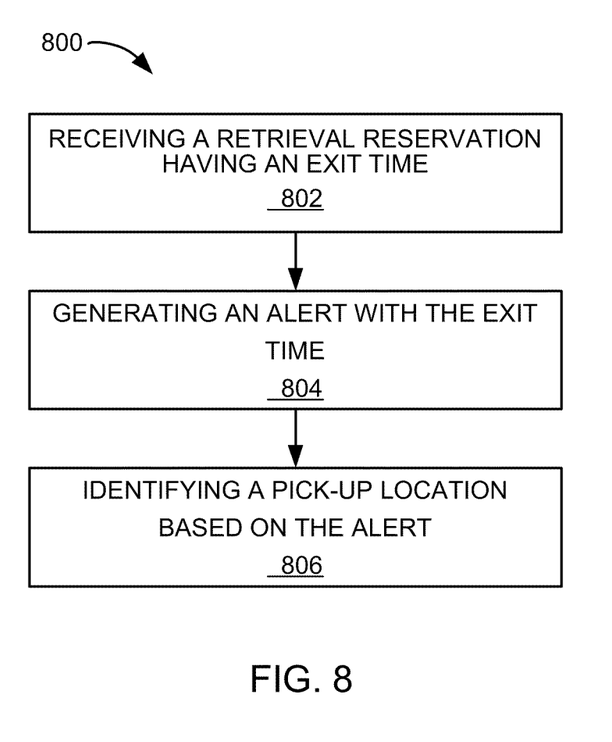
FIG. 8 is a flow chart of a method of operation of a navigation system in a further embodiment of the present invention.

Referring now to FIG. 8, therein is shown a flow chart of a method 800 of operation of the navigation system 100 of FIG. 1 in a further embodiment of the present invention. The method 800 includes: receiving a retrieval reservation having an exit time in a block 802; generating an alert with the exit time for retrieving a vehicle from a parked location in a block 804; and identifying a pick-up location based on the alert for parking the vehicle at the pick-up location in a block 806.

The resulting method, process, apparatus, device, product, and system is straightforward, cost-effective, uncomplicated, highly versatile, accurate, sensitive, and effective, and can be implemented by adapting known components for ready, efficient, and economical manufacturing, application, and utilization.

Another important aspect of the present invention is that it valuably supports and services the historical trend of reducing costs, simplifying systems, and increasing performance. These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of a navigation system comprising:
    receiving a retrieval reservation having an exit time;
    generating an alert with the exit time for retrieving a vehicle from a parked location;
    identifying a pick-up location based on the alert for parking the vehicle at the pick-up location; and
wherein:
    identifying the pick-up location includes selecting the pick-up location in an order of the exit time relative to a further retrieval reservation.

2. The method as claimed in claim 1 further comprising receiving a request for an alternate location for the pick-up location.

3. The method as claimed in claim 1 further comprising:
    calculating a buffer time before the exit time; and
wherein:
    generating the alert with the exit time includes generating the alert at the buffer time.

4. The method as claimed in claim 1 further comprising:
    receiving an event end time; and
    modifying the retrieval reservation based on the event end time.

5. A method of operation of a navigation system comprising:
    receiving a retrieval reservation having an exit time;
    receiving an event end time;
    modifying the retrieval reservation based on the event end time;
    calculating a buffer time before the event end time;
    generating an alert at the buffer time for retrieving a vehicle from a parked location; and
    identifying a pick-up location based on the alert for parking the vehicle that is retrieved from the parked location.

6. The method as claimed in claim 5 further comprising generating a route from a user's location to the pick-up location.

7. The method as claimed in claim 5 wherein modifying the retrieval reservation based on the event end time includes modifying the exit time based on a change to the event end time.

8. The method as claimed in claim 5 further comprising receiving a change notification to the exit time.

9. The method as claimed in claim 5 further comprising identifying a parking facility with the retrieval reservation.

10. A navigation system comprising:
    a retrieval reservation module for receiving a retrieval reservation having an exit time;
    a generate alert module, coupled to the retrieval reservation module, for generating an alert with the exit time for retrieving a vehicle from a parked location; and
    a pick-up location module, coupled to the generate alert module, for identifying a pick-up location based on the alert for parking the vehicle at the pick-up location that is retrieved from the parked location, with the pick-up location module including:
        a selection module for selecting the pick-up location in an order of the exit time relative to a further retrieval reservation.

11. The system as claimed in claim 10 wherein the pick-up location module includes an alternate location module, coupled to the generate alert module, for receiving a request for an alternate location for the pick-up location.

12. The system as claimed in claim 10 wherein:
    the retrieval reservation module includes a buffer time module for calculating a buffer time before the exit time; and
    the generate alert module is for generating the alert at the buffer time.

13. The system as claimed in claim 10 wherein the retrieval reservation module includes:
    an event receive module for receiving an event end time; and
    an event reservation module, coupled to the event receive module, for modifying the retrieval reservation based on the event end time.

14. The system as claimed in claim 10 wherein:
    the retrieval reservation module includes:
        an event receive module for receiving an event end time,
        an event reservation module, coupled to the event receive module, for modifying the retrieval reservation based on the event end time,
        a buffer time module, coupled to the event reservation module, for calculating the buffer time before the event end time; and
    the generate alert module is for generating an alert at the buffer time for retrieving the vehicle from the parked location.

15. The system as claimed in claim 14 wherein the pick-up location module includes a route module for generating a route from a user's location to the pick-up location.

16. The system as claimed in claim 14 wherein the retrieval reservation module includes an event modify module for modifying the exit time based on a change to the event end time.

17. The system as claimed in claim 14 wherein the retrieval reservation module includes a change notification module for receiving a change notification to the exit time.

18. The system as claimed in claim 14 further comprising a find facility module, coupled to retrieval reservation module, for identifying a parking facility with the retrieval reservation.

* * * * *